US012255421B2

(12) United States Patent
Hsu et al.

(10) Patent No.: US 12,255,421 B2
(45) Date of Patent: Mar. 18, 2025

(54) CONNECTOR LOCK STRUCTURE HAVING A GUARDING FUNCTION

(71) Applicant: Cheng Uei Precision Industry Co., LTD., New Taipei (TW)

(72) Inventors: Li Nien Hsu, New Taipei (TW); Sheng Nan Yu, New Taipei (TW); Chun Fu Lin, New Taipei (TW)

(73) Assignee: CHENG UEI PRECISION INDUSTRY CO., LTD., New Taipei (TW)

( * ) Notice: Subject to any disclaimer, the term of this patent is extended or adjusted under 35 U.S.C. 154(b) by 484 days.

(21) Appl. No.: 17/730,095

(22) Filed: Apr. 26, 2022

(65) Prior Publication Data

US 2022/0399681 A1 Dec. 15, 2022

(30) Foreign Application Priority Data

Jun. 10, 2021 (CN) ........................ 202121303309.X

(51) Int. Cl.

*H01R 13/639* (2006.01)
*H01R 13/405* (2006.01)
*H01R 13/516* (2006.01)
*H01R 13/629* (2006.01)
*H01R 24/60* (2011.01)

(52) U.S. Cl.

CPC ......... *H01R 13/639* (2013.01); *H01R 13/405* (2013.01); *H01R 13/516* (2013.01); *H01R 13/629* (2013.01); *H01R 24/60* (2013.01)

(58) Field of Classification Search

CPC ..................................................... H01R 13/639
USPC ........................................................... 439/352
See application file for complete search history.

(56) References Cited

U.S. PATENT DOCUMENTS

| | | | | |
|---|---|---|---|---|
| 2015/0339498 | A1* | 11/2015 | Ahn | G06F 21/83 726/34 |
| 2016/0294098 | A1* | 10/2016 | Clark | G06F 21/83 |
| 2017/0062979 | A1* | 3/2017 | Fujita | H01R 13/6315 |
| 2022/0337002 | A1* | 10/2022 | Nguyen | H01R 13/6273 |

* cited by examiner

*Primary Examiner* — Abdullah A Riyami
*Assistant Examiner* — Amara Anderson
(74) *Attorney, Agent, or Firm* — Cheng-Ju Chiang

(57) ABSTRACT

A connector lock structure includes an insulating body, a plurality of terminals, a shell, a locking assembly, a sliding board, a pressing element and an unlocking tool. The insulating body is molded around the plurality of the terminals. The shell surrounds the insulating body. The locking assembly includes at least one lacking groove, and at least one elastic arm formed in the at least one lacking groove. The at least one elastic arm has a hook structure. The hook structure is cooperated with a blocking groove of a docking connector. The pressing element is mounted in the insulating body. The sliding board is slidably mounted under the pressing element. One end of the pressing element has a locking portion. The locking portion has a keyhole. The unlocking tool is inserted in the keyhole.

20 Claims, 8 Drawing Sheets

CONNECTOR LOCK STRUCTURE HAVING A GUARDING FUNCTION

CROSS-REFERENCE TO RELATED APPLICATION

The present application is based on, and claims priority from, China Patent Application No. 202121303309.X, filed Jun. 10, 2021, the disclosure of which is hereby incorporated by reference herein in its entirety.

BACKGROUND OF THE INVENTION

1. Field of the Invention

The present invention generally relates to a connector lock structure, and more particularly to a connector lock structure having a guarding function.

2. The Related Art

With the rapid development of sciences and technologies, laptops are more and more widely used in people's daily lives, so a paperless office becomes one of future developing trends. Conventionally, a USB (Universal Serial Bus) electrical connector copies information quickly and conveniently, so the USB (Universal Serial Bus) electrical connector gets people's favor. However, the USB electrical connector is without a guarding function, so when a user puts the USB electrical connector in public places, the USB electrical connector is frequently taken by others. Consequently, the information in the USB electrical connector and confidential data in the laptop are frequently copied by others.

When the user positions the laptop in the public places, a conventional connector lock structure and a cable is integrated to make a simple way to prevent that the confidential data of the laptop is copied by others. Nonetheless, more and more laptops are without built-in security slots. Because the laptops are without the built-in security slots, the conventional connector lock structures are mismatched with the laptops, so the user has to make the laptop equipped with a peripheral accessory to match with the conventional connector lock structure.

Therefore, it is necessary to provide a connector lock structure having a guarding function.

SUMMARY OF THE INVENTION

An object of the present invention is to provide a connector lock structure having a guarding function. The connector lock structure is adapted for being docked with a docking connector. The docking connector has a metal casing. A bottom of the metal casing defines a blocking groove. The connector lock structure includes an insulating body, a plurality of terminals, a shell, a locking assembly, a sliding board, a pressing element and an unlocking tool. The insulating body is molded around the plurality of the terminals by an injection molding technology. The shell surrounds a peripheral surface of the insulating body. The shell has a bottom plate. The bottom plate is mounted to a bottom surface of the insulating body. The locking assembly includes at least one lacking groove and at least one elastic arm. A front end of the bottom plate of the shell defines the at least one lacking groove extending longitudinally. The at least one elastic arm is formed in the at least one lacking groove. A tail end of the at least one elastic arm has a hook structure. The hook structure is cooperated with the blocking groove of the metal casing of the docking connector. The hook structure is buckled in the blocking groove of the metal casing of the docking connector. The sliding board is slidably mounted to the bottom surface of the insulating body. The sliding board slides along a docking direction of the connector lock structure. The pressing element is mounted in the insulating body. The pressing element is mounted on a top surface of the sliding board. The sliding board is slidably mounted under the pressing element. The pressing element is tightly cooperated with the sliding board. One end of the pressing element has a locking portion. An outer surface of the locking portion has a keyhole. The locking portion projects beyond one side surface of the insulating body. The locking portion projects beyond one side surface of the shell. The unlocking tool is inserted in the keyhole of the locking portion of the pressing element. The unlocking tool is rotated to make the unlocking tool drive the locking portion of the pressing element to rotate, and then the pressing element drives the sliding board to move horizontally to abut against the at least one elastic arm, so that the at least one elastic arm is locked to the blocking groove of the metal casing of the docking connector.

Another object of the present invention is to provide a connector lock structure adapted for being docked with a docking connector. The docking connector has a metal casing. A bottom of the metal casing defines two blocking grooves. The connector lock structure includes an insulating body, a plurality of terminals, a shell, a locking assembly, a sliding board, a pressing element and an unlocking tool. The insulating body is molded around the plurality of the terminals. The shell surrounds the insulating body. The shell has a bottom plate. The bottom plate is mounted to a bottom surface of the insulating body. The locking assembly includes two lacking grooves and two elastic arms. Two sides of a front end of the bottom plate of the shell define the two lacking grooves extending longitudinally. A rear end wall of each lacking groove slantwise extends frontward and upward, and then is arched upward to form the elastic arm. A tail end of each elastic arm has a hook structure. The sliding board is slidably mounted to the bottom surface of the insulating body. The sliding board slides along a docking direction of the connector lock structure. The pressing element is mounted in the insulating body. The sliding board is slidably mounted under the pressing element. One end of the pressing element has a locking portion. An outer surface of the locking portion has a keyhole. The locking portion projects beyond one side surface of the insulating body. The locking portion projects beyond one side surface of the shell. The unlocking tool is inserted in the keyhole of the locking portion of the pressing element. The unlocking tool is rotated to make the unlocking tool drive the locking portion of the pressing element to rotate, when the sliding board slides frontward, the sliding board slides over the two elastic arms, and the sliding board presses the two elastic arms downward, the hook structures of the two elastic arms hook in the two blocking grooves, when the sliding board slides rearward, the sliding board slides away from the two elastic arms, and then the hook structures of the two elastic arms break away from the two blocking grooves, so that the two elastic arms are locked to or unlocked from the two blocking grooves of the metal casing of the docking connector.

Another object of the present invention is to provide a connector lock structure adapted for being docked with a docking connector. The docking connector has a metal casing. A bottom of the metal casing defines two blocking grooves. The connector lock structure includes an insulating body, a plurality of terminals, a shell, a locking assembly, a sliding board, a pressing element and an unlocking tool. The insulating body is molded around the plurality of the terminals. The shell surrounds the insulating body. The shell has a bottom plate. The bottom plate is mounted to a bottom surface of the insulating body. The locking assembly includes two lacking grooves and two elastic arms. Two sides of a front end of the bottom plate of the shell define the two lacking grooves extending longitudinally. A rear end wall of each lacking groove slantwise extends frontward and upward, and then is arched upward to form the elastic arm. A tail end of each elastic arm has a hook structure. The sliding board is slidably mounted to the bottom surface of the insulating body. The sliding board slides along a docking direction of the connector lock structure. Two sides of a front end of a bottom surface of the sliding board slantwise extend frontward and upward to form two inclined surfaces. The two inclined surfaces are parallel to inner surfaces of initial ends of the two elastic arms. The pressing element is mounted in the insulating body. The sliding board is slidably mounted under the pressing element. One end of the pressing element has a locking portion. An outer surface of the locking portion has a keyhole. The locking portion projects beyond one side surface of the insulating body. The locking portion projects beyond one side surface of the shell. The unlocking tool is inserted in the keyhole of the locking portion of the pressing element. The unlocking tool is rotated to make the unlocking tool drive the locking portion of the pressing element to rotate, when the sliding board slides frontward, the sliding board slides over the two elastic arms, and the sliding board presses the two elastic arms downward, the hook structures of the two elastic arms hook in the two blocking grooves, when the sliding board slides rearward, the sliding board slides away from the two elastic arms, and then the hook structures of the two elastic arms break away from the two blocking grooves, so that the two elastic arms are locked to or unlocked from the two blocking grooves of the metal casing of the docking connector.

As described above, the connector lock structure is prevented from being randomly pulled by virtue of a combination design of the locking assembly and the pressing element, so that the connector lock structure has the guarding function.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Referring to FIG. 1 to FIG. 6, a connector lock structure 100 in accordance with a preferred embodiment of the present invention is shown. The connector lock structure 100 is adapted for being docked with a docking connector 200. The connector lock structure 100 includes a shell 10 and an insulating body 30. The connector lock structure 100 is a full feature USB (Universal Serial Bus) male connector. The connector lock structure 100 is a laptop lock. The connector lock structure 100 is matched with the docking connector 200. The docking connector 200 is a USB female connector and the docking connector 200 is adapted for being mounted in a laptop (not shown).

Figure 1:
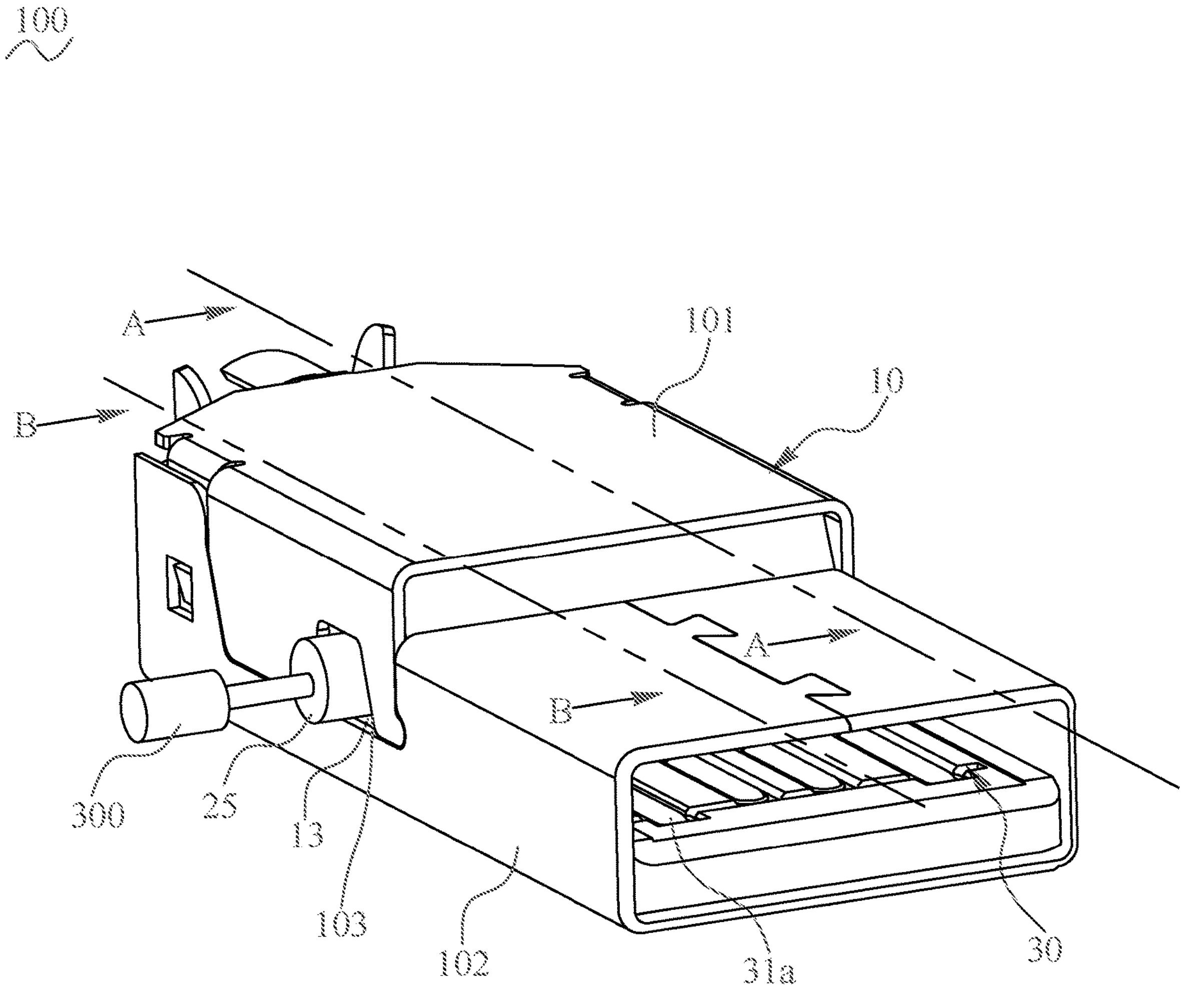
FIG. 1 is a perspective view of a connector lock structure in accordance with a preferred embodiment of the present invention.
Figure 2:
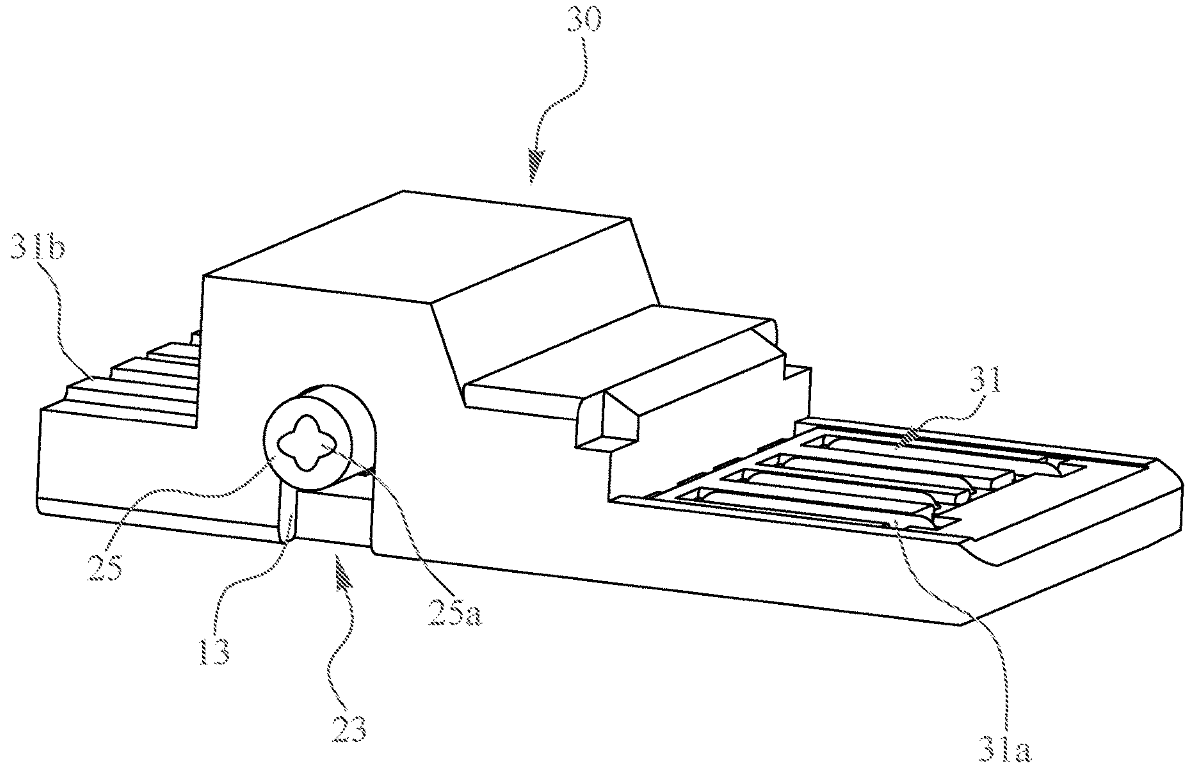
FIG. 2 is a perspective view of an insulating body of the connector lock structure of FIG. 1.
Figure 3:
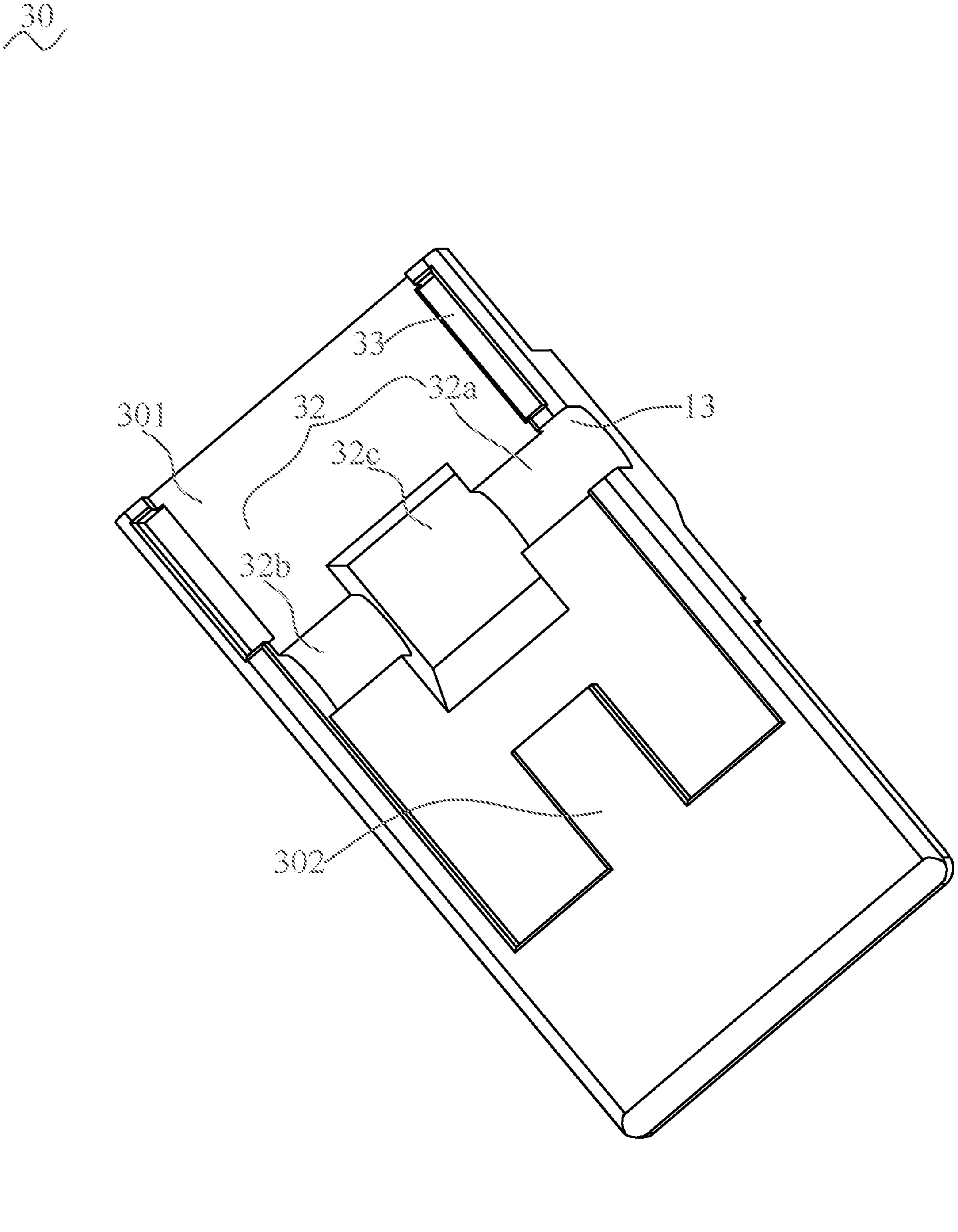
FIG. 3 is another perspective view of the insulating body of the connector lock structure of FIG. 1.
Figure 4:
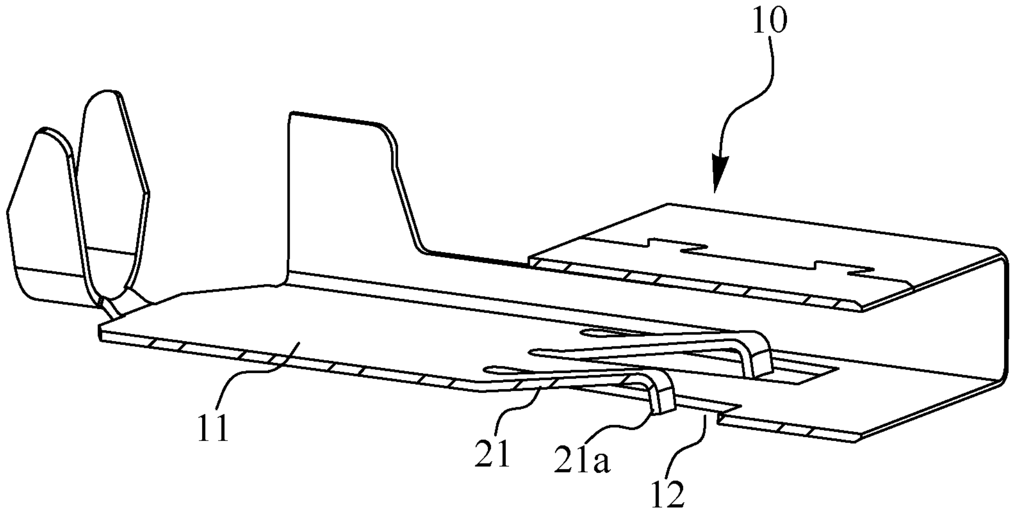
FIG. 4 is a sectional view of a shell of the connector lock structure along a line B-B of FIG. 1.
Figure 5:
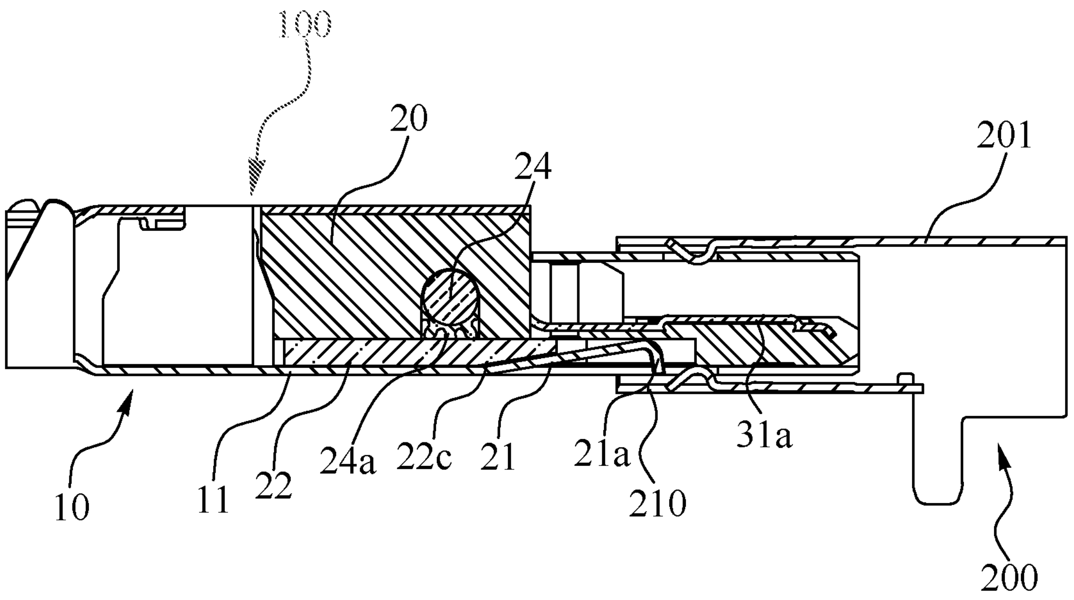
FIG. 5 is a sectional view of the connector lock structure along a line A-A of FIG. 1.
Figure 6:
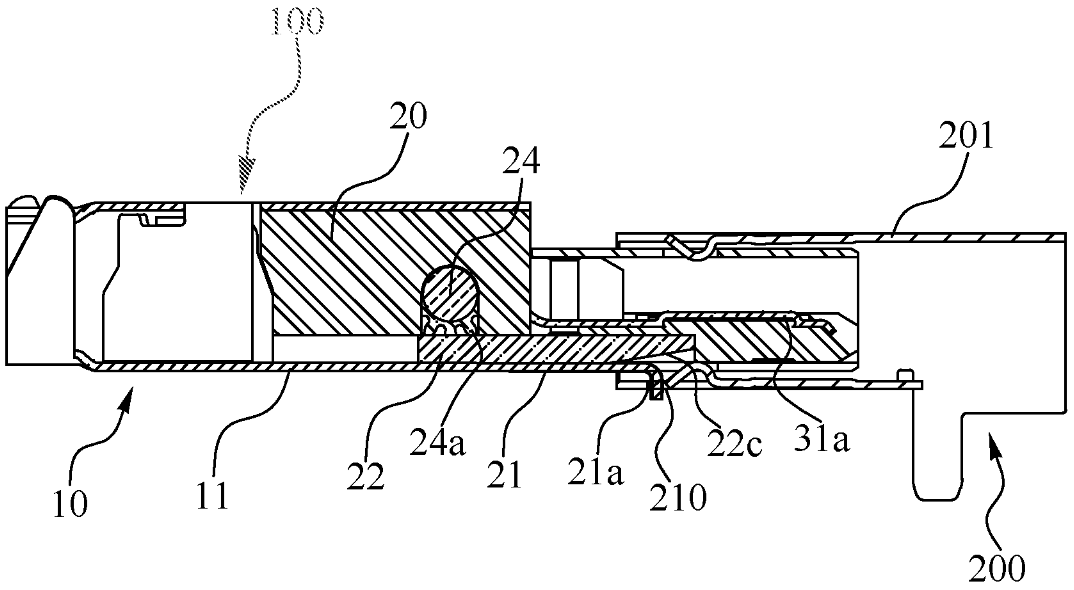
FIG. 6 is a sectional view of the locked connector lock structure along the line A-A of FIG. 1.
Figure 7:
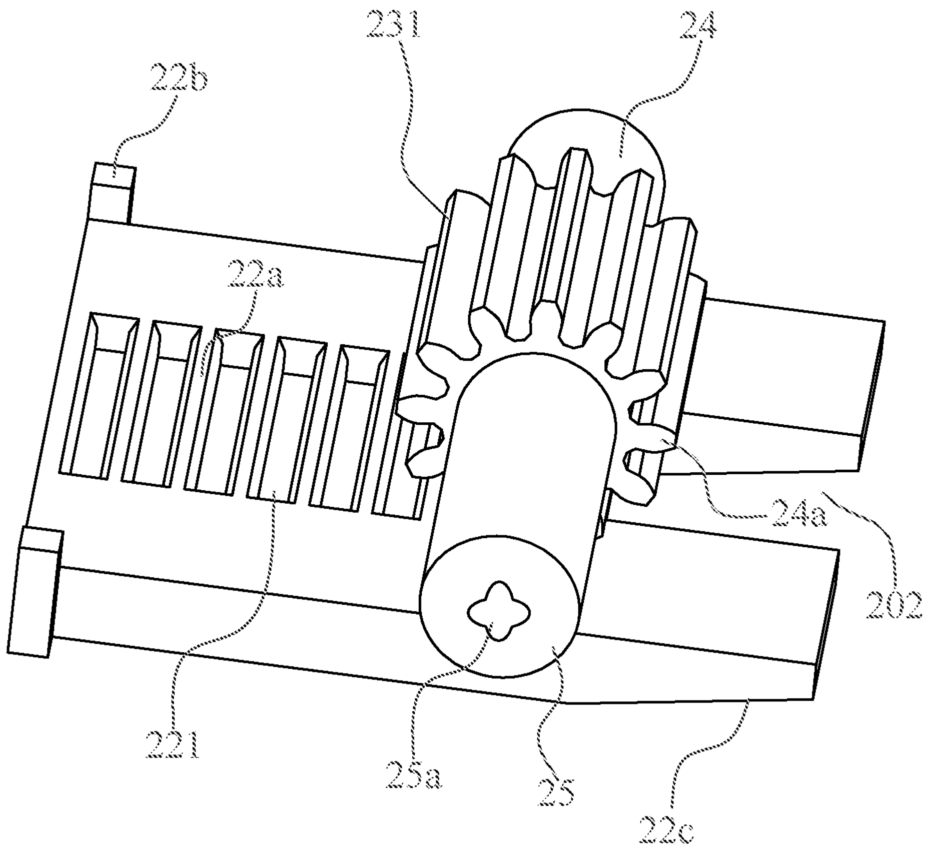
FIG. 7 is a perspective view of a pressing element of the connector lock structure in accordance with the present invention.

Referring to FIG. 1, FIG. 2 and FIG. 4, the insulating body 30 extends along an insertion direction of the connector lock structure 100. The docking connector 200 is inserted into or withdrawn from the connector lock structure 100 along the insertion direction of the connector lock structure 100. In order to describe the connector lock structure 100 conveniently, a front end of the connector lock structure 100 is defined as one end of the connector lock structure 100 which is docked with the docking connector 200. A rear end of the connector lock structure 100 is defined as the other end of the connector lock structure 100 that is soldered to a circuit board (not shown) or a cable assembly (not shown). A frontward direction is defined as a direction in which the connector lock structure 100 moves towards the docking connector 200. A rearward direction is defined as a direction in which the connector lock structure 100 is apart away from the docking connector 200.

The connector lock structure 100 includes a plurality of terminals 31. The insulating body 30 is molded around the plurality of the terminals 31 by an injection molding technology. Each terminal 31 has a contact portion 31*a* and a soldering portion 31*b*. A front end of each terminal 31 is defined as the contact portion 31*a*. A rear end of each terminal 31 is defined as the soldering portion 31*b*. The contact portion 31*a* of each terminal 31 is fastened to a front end of the insulating body 30, and the contact portion 31*a* of each terminal 31 is exposed to a front end of an upper surface of the insulating body 30. The soldering portion 31*b* of each terminal 31 is fastened to a rear end of the insulating body 30, and the soldering portion 31*b* of each terminal 31 is exposed to a rear end of the upper surface of the insulating body 30.

Referring to FIG. 1 to FIG. 6, the shell 10 surrounds a peripheral surface of the insulating body 30. The shell 10 includes an upper shell 101 and a lower shell 102. The upper shell 101 is covered on a top surface of the insulating body 30. When the connector lock structure 100 is docked with the docking connector 200, in order to improve an interconnecting security between the connector lock structure 100 and the docking connector 200, the shell 10 is equipped with a locking assembly 20. A bottom of the docking connector 200 has a blocking groove 210. The docking connector 200 has a metal casing 201. A bottom of the metal casing 201 defines the blocking groove 210. Two sides of the bottom of the docking connector 200 have two blocking grooves 210. The bottom of the metal casing 201 defines the two blocking grooves 210. The locking assembly 20 of the connector lock structure 100 is matched with the blocking groove 210 of the docking connector 200. The locking assembly 20 of the connector lock structure 100 is cooperated with the blocking groove 210 of the metal casing 201 of the docking connector 200.

The shell 10 has a bottom plate 11. The lower shell 102 has the bottom plate 11. The bottom plate 11 is mounted to a bottom surface of the insulating body 30. The locking assembly 20 includes at least one lacking groove 12 and at least one elastic arm 21. A front end of the bottom plate 11 of the shell 10 defines the at least one lacking groove 12 extending longitudinally and extending along the insertion direction of the connector lock structure 100. The at least one elastic arm 21 is formed in the at least one lacking groove 12. The at least one elastic arm 21 is inclined towards a lower surface of the insulating body 30. The bottom surface of the insulating body 30 surrounds a front and two sides of the lower surface of the insulating body 30. A rear end wall of the at least one lacking groove 12 slantwise extends frontward and upward, and then is arched upward to form the at least one elastic arm 21. A tail end of the at least one elastic arm 21 has a hook structure 21*a*. The hook structure 21*a* is extended downward from the at least one elastic arm 21.

The tail end of the at least one elastic arm 21 is punched upward from the bottom plate 11 of the shell 10, and then is arched upward and towards the lower surface of the insulating body 30 to form the hook structure 21*a*. The hook structure 21*a* is cooperated with the blocking groove 210 of the metal casing 201 of the docking connector 200. The hook structure 21*a* is buckled in the blocking groove 210 of the metal casing 201 of the docking connector 200. A front end of the at least one elastic arm 21 is free. A top surface of the hook structure 21*a* of the front end of the at least one elastic arm 21 is a convex surface. The convex surface of the at least one elastic arm 21 is arched upward, and the convex surface of the at least one elastic arm 21 is an arc shape.

In the preferred embodiment, the locking assembly 20 includes two lacking grooves 12 and two elastic arms 21. Two sides of the front end of the bottom plate 11 of the shell 10 define the two lacking grooves 12 extending longitudinally. The two elastic arms 21 are formed in the two lacking grooves 12. The two elastic arms 21 are inclined towards the lower surface of the insulating body 30. The rear end wall of each lacking groove 12 slantwise extends frontward and upward, and then is arched upward to form the elastic arm 21. The tail end of each elastic arm 21 has the hook structure 21*a*. The tail end of each elastic arm 21 is punched upward from the bottom plate 11, and then is arched upward and towards the lower surface of the insulating body 30 to form the hook structure 21*a*. The hook structure 21*a* is cooperated with the blocking groove 210. The hook structure 21*a* is buckled in the blocking groove 210. The front end of each elastic arm 21 is free. A top surface of the front end of each elastic arm 21 is the convex surface. The convex surface of each elastic arm 21 is arched upward, and the convex surface of each elastic arm 21 is shown as the arc shape.

Referring to FIG. 3 to FIG. 6, after the connector lock structure 100 is docked with the docking connector 200, in order to ensure that the hook structure 21*a* is locked in the blocking groove 210 of the docking connector 200, the locking assembly 20 includes a sliding board 22. The sliding board 22 is slidably mounted to the lower surface of the insulating body 30. A rear end of the bottom surface of the insulating body 30 is recessed inward to form a sliding groove 301. An inner surface of a top wall of the sliding groove 301 is defined as the lower surface of the insulating body 30. A middle of an inner surface of a front end wall of the sliding groove 301 extends rearward to form an insertion block 302. The sliding board 22 is slidably mounted in the sliding groove 301. A bottom surface of the sliding board 22 is flush with the bottom surface of the insulating body 30. The sliding board 22 slides in the sliding groove 301 of the insulating body 30 along the insertion direction of the connector lock structure 100.

The sliding board 22 is disposed on an upper surface of the bottom plate 11. The sliding board 22 slides along the upper surface of the bottom plate 11. A middle of a front end of the sliding board 22 is recessed rearward to form a notch 202. When the sliding board 22 slides frontward and towards the front end of the bottom plate 11, the sliding board 22 slides over the at least one elastic arm 21 and the sliding board 22 presses the at least one elastic arm 21 downward, so that a force is exerted on the hook structure 21*a* of the at least one elastic arm 21 to hook in the blocking groove 210 of the docking connector 200. The insertion block 302 is inserted into the notch 202. When the sliding board 22 slides rearward and towards a rear end of the bottom plate 11, the sliding board 22 slides away from the at least one elastic arm 21, so that the at least one elastic arm 21 is restored to an original state by an elasticity function, and then the hook structure 21*a* of the at least one elastic arm 21 breaks away from the blocking groove 210. The insertion block 302 breaks away from the notch 202. When the connector lock structure 100 is used in the laptop (not shown), the user is able to lock or unlock the laptop by hooking the hook structure 21*a* of the at least one elastic arm 21 in the blocking groove 210 of the docking connector 200 or releasing the hook structure 21*a* of the at least one elastic arm 21 from the blocking groove 210 of the docking connector 200.

When the sliding board 22 slides frontward and towards the front end of the bottom plate 11, the sliding board 22 slides over the two elastic arms 21 and the sliding board 22 presses the two elastic arms 21 downward, so that the force is exerted on the hook structures 21*a* of the two elastic arms 21, and the hook structures 21*a* of the two elastic arms 21 hook in the two blocking grooves 210 of the docking connector 200. When the sliding board 22 slides rearward and towards the rear end of the bottom plate 11, the sliding board 22 slides away from the two elastic arms 21, so that the two elastic arms 21 are restored to the original states by the elasticity function, and then the hook structures 21*a* of the two elastic arms 21 break away from the two blocking grooves 210 of the blocking groove 210. The sliding board 22 slides frontward or rearward, so that the two elastic arms 21 are locked to or unlocked from the two blocking grooves 210 of the metal casing 201 of the docking connector 200. When the connector lock structure 100 is used in the laptop (not shown), the user is able to lock or unlock the laptop by hooking the hook structures 21*a* of the two elastic arms 21 in the two blocking grooves 210 of the docking connector 200 or releasing the hook structures 21*a* of the two elastic arms 21 from the two blocking grooves 210 of the docking connector 200.

Referring to FIG. 1 to FIG. 7, in order to facilitate that the user slides the sliding board 22 to lock or unlock the laptop, the connector lock structure 100 further includes a pressing element 23. Several portions of a periphery of a middle of the pressing element 23 protrude outward to form a plurality of teeth 231. Each tooth 231 is protruded outward along a radial direction of the pressing element 23. The pressing element 23 is mounted in the insulating body 30. The pressing element 23 is mounted on a top surface of the sliding board 22. The pressing element 23 is clamped between the sliding board 22 and the insulating body 30. The pressing element 23 is tightly cooperated with the sliding board 22. The sliding board 22 is slidably mounted under the pressing element 23. Several portions of the top surface of the sliding board 22 are recessed inward to form a plurality of buckling slots 221. The plurality of the buckling slots 221 are arranged along the insertion direction of the connector lock structure 100. The teeth 231 of the pressing element 23 are engaged with the plurality of the buckling slots 221 of the sliding board 22 for sliding the sliding board 22 more easily.

In this preferred embodiment, a middle of the rear end of the bottom surface of the insulating body 30 is recessed inward to form an accommodating groove 32 penetrating through one side surface of the insulating body 30. The pressing element 23 is accommodated in the accommodating groove 32. The pressing element 23 has a gear spindle 24 and a gear 24*a*. The gear spindle 24 is transversely mounted in the accommodating groove 32, and the gear spindle 24 projects beyond the one side surface of the insulating body 30. An axis of the gear spindle 24 is orthogonal to the insertion direction of the connector lock structure 100. The gear spindle 24 is rotatably mounted in the accommodating groove 32. The gear 24*a* is mounted around the middle of the gear spindle 24. A periphery of the gear 24*a* has the plurality of the teeth 231. The top surface of the sliding board 22 has a plurality of splines 22*a* among the plurality of the buckling slots 221. Each two adjacent buckling slots 221 are isolated by a spline 22*a*. The plurality of the splines 22*a* of the sliding board 22 are engaged with the plurality of the teeth 231 of the gear 24*a* of the pressing element 23.

One end of the pressing element 23 has a locking portion 25. One end of the gear spindle 24 has the locking portion 25. An outer surface of the locking portion 25 has a keyhole 25*a*. The keyhole 25*a* is matched with an unlocking tool 300. The unlocking tool 300 is inserted in the keyhole 25*a* of the locking portion 25 of the pressing element 23. Therefore, after the unlocking tool 300 is inserted into the keyhole 25*a*, the unlocking tool 300 is rotated by the user to make the unlocking tool 300 drive the locking portion 25 of the gear spindle 24 of the pressing element 23 to rotate, and then the gear 24*a* of the pressing element 23 drives the sliding board 22 to move horizontally to slide over the at least one elastic arm 21 to abut against the at least one elastic arm 21 or break away from the at least one elastic arm 21, so that the at least one elastic arm 21 is locked to or unlocked from the blocking groove 210 of the metal casing 201 of the docking connector 200. Each of the keyhole 25*a* and the unlocking tool 300 is formed in a plum blossom shape. In another preferred embodiment, each of the keyhole 25*a* and the unlocking tool 300 is formed in a polygon shape.

Referring to FIG. 1 to FIG. 7, in this preferred embodiment, the accommodating groove 32 is recessed upward from the bottom surface of the insulating body 30, and the accommodating groove 32 is located near the rear end of the insulating body 30. The accommodating groove 32 includes a first recess 32*a*, a second recess 32*b* and a third recess 32*c*. The third recess 32*c* is connected between the first recess 32*a* and the second recess 32*b*. The first recess 32*a* and the second recess 32*b* are located at two sides of the insulating body 30. The first recess 32*a* and the second recess 32*b* are symmetrical to each other with respect to the third recess 32*c*. Bottoms of the first recess 32*a*, the second recess 32*b* and the third recess 32*c* are opened freely. An inner surface of a side wall of each of the first recess 32*a* and the second recess 32*b* is shown as an inverted U shape. Two ends of the gear spindle 24 are mounted in the first recess 32*a* and the second recess 32*b*, respectively. The first recess 32*a* and the second recess 32*b* accommodate the two ends of the gear spindle 24. The third recess 32*c* is a trapezoid shape which is seen from a side view.

In this preferred embodiment, the first recess 32*a* penetrates through the one side surface of the insulating body 30, and an outer side of the first recess 32*a* is defined as an opening 13, so that the first recess 32*a* is communicated with an external space through the opening 13. A bottom edge of one side of the shell 10 adjacent to the opening 13 of the first recess 32*a* is recessed upward to form a locating groove 103. A bottom edge of one side of the upper shell 101 adjacent to the opening 13 of the first recess 32*a* is recessed upward to form the locating groove 103. The locking portion 25 with the keyhole 25*a* projects out of the one side surface of the insulating body 30 from the opening 13 of the first recess 32*a*. The locking portion 25 with the keyhole 25*a* projects out of one side surface of the shell 10 from the locating groove 103 of the shell 10. The locking portion 25 with the keyhole 25*a* projects out of one side surface of the upper shell 101 from the locating groove 103 of the upper shell 101. The locking portion 25 with the keyhole 25*a* projects beyond the one side surface of the insulating body 30. The locking portion 25 with the keyhole 25*a* projects beyond the one side surface of the shell 10. The locking portion 25 with the keyhole 25*a* projects beyond the one side surface of the upper shell 101. Two sides of the rear end of the bottom surface of the insulating body 30 are recessed inward to form two guiding slots 33. Rear ends of two side surfaces of the sliding board 22 protrude outward and then extend upward to form two guiding blocks 22*b*.

The two guiding blocks 22*b* project beyond the top surface of the sliding board 22. The two guiding blocks 22*b* are disposed in the two guiding slots 33. The two guiding blocks 22*b* are able to slide in the two guiding slots 33 to slide along the insertion direction of the connector lock structure 100. Two sides of a front end of the bottom surface of the sliding board 22 slantwise extend frontward and upward to form two inclined surfaces 22*c*. When the two elastic arms 21 are in the original states, the two inclined surfaces 22*c* are parallel to inner surfaces of the two elastic arms 21, so that the sliding board 22 easily pushes against the two elastic arms 21 to press downward the two elastic arms 21.

Referring to FIG. 1 to FIG. 7 again, when the user inserts the connector lock structure 100 into the docking connector 200, the unlocking tool 300 is inserted into the keyhole 25*a*, and the user rotates the unlocking tool 300 in a forward direction to drive the locking portion 25 and the gear spindle 24 to rotate in the forward direction, so that the sliding board 22 is pushed to slide in the sliding groove 301, and the sliding board 22 is pushed to move frontward and towards the front end of the insulating body 30 to press downward the two elastic arms 21. The hook structures 21*a* of the two elastic arms 21 are hooked in the two blocking grooves 210 of the docking connector 200. The sliding board 22 abuts against a top wall of the sliding groove 301 of the insulating body 30 and the two elastic arms 21, so the two elastic arms 21 are prevented from returning to the original states, and then the two hook structures 21*a* of the two elastic arms 21 are locked in the two blocking grooves 210 of the docking connector 200.

When the user need pull the connector lock structure 100 out from the docking connector 200, the unlocking tool 300 is inserted into the keyhole 25*a*, and the user rotates the unlocking tool 300 in a reverse direction to drive the locking portion 25 and the gear spindle 24 to rotate in the reverse direction, so that the sliding board 22 is pushed to slide in the sliding groove 301, and the sliding board 22 is pushed to move rearward and towards the rear end of the insulating body 30 to release the two elastic arms 21. The two elastic arms 21 are restored to the original states by the elasticity function. The hook structures 21*a* of the two elastic arms 21 are disengaged from the two blocking grooves 210 of the docking connector 200. Therefore, the connector lock structure 100 is unlocked with the docking connector 200, the connector lock structure 100 is pulled out from the docking connector 200. The connector lock structure 100 is prevented from being randomly pulled by virtue of a combination design of the locking assembly 20 and the pressing element 23, so that the connector lock structure 100 has a guarding function.

Figure 8:
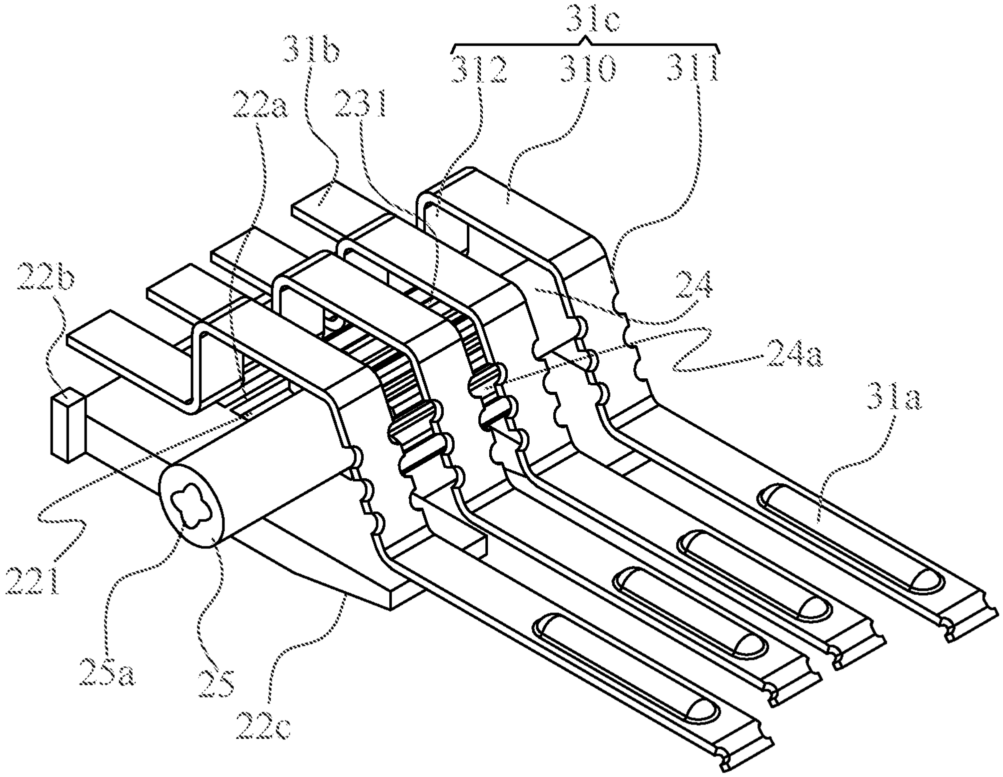
FIG. 8 is an assembling view showing that the pressing element, a sliding board and terminals of the connector lock structure in accordance with the present invention.

Referring to FIG. 2 and FIG. 8, each terminal 31 has the contact portion 31*a*, the soldering portion 31*b*, and a body portion 31*c* connected between the contact portion 31*a* and the soldering portion 31*b*. The body portion 31*c* is received in the insulating body 30. The body portion 31*c* has a middle region 310, a front region 311 and a rear region 312. The middle region 310 is connected between the front region 311 and the rear region 312. The front region 310 is connected between the contact portion 31*a* and the middle region 310. The rear region 312 is connected between the soldering portion 31*b* and the middle region 310. The middle region 310 is located above the pressing element 23. The front region 311 is located in front of the pressing element 23. The rear region 312 is located behind the pressing element 23. So, the pressing element 23 is surrounded by the body portion 31*c* of each terminal 31.

As described above, the connector lock structure 100 is prevented from being randomly pulled by virtue of the combination design of the locking assembly 20 and the pressing element 23, so that the connector lock structure 100 has the guarding function.

What is claimed is:

1. A connector lock structure having a guarding function adapted for being docked with a docking connector, the docking connector having a metal casing, a bottom of the metal casing defining a blocking groove, the connector lock structure comprising:

an insulating body;

a plurality of terminals, the insulating body being molded around the plurality of terminals by an injection molding technology;

a shell surrounding a peripheral surface of the insulating body, the shell having a bottom plate, the bottom plate being mounted to a bottom surface of the insulating body;

a locking assembly including at least one lacking groove and at least one elastic arm, a front end of the bottom plate of the shell defining the at least one lacking groove extending longitudinally, the at least one elastic arm being formed in the at least one lacking groove, a tail end of the at least one elastic arm having a hook structure, the hook structure being cooperated with the blocking groove of the metal casing of the docking connector, the hook structure being buckled in the blocking groove of the metal casing of the docking connector;

a sliding board slidably mounted to the bottom surface of the insulating body, the sliding board sliding along a docking direction of the connector lock structure;

a pressing element mounted in the insulating body, the pressing element being mounted on a top surface of the sliding board, the sliding board being slidably mounted under the pressing element, the pressing element being tightly cooperated with the sliding board, one end of the pressing element having a locking portion, an outer surface of the locking portion having a keyhole, the locking portion projecting beyond one side surface of the insulating body, the locking portion projecting beyond one side surface of the shell;

an unlocking tool inserted in the keyhole of the locking portion of the pressing element;

wherein the unlocking tool is rotated to make the unlocking tool drive the locking portion of the pressing element to rotate, and then the pressing element drives the sliding board to move horizontally to abut against the at least one elastic arm, so that the at least one elastic arm is locked to the blocking groove of the metal casing of the docking connector.

2. The connector lock structure having a guarding function as claimed in claim 1, wherein a middle of a rear end of the bottom surface of the insulating body is recessed inward to form an accommodating groove penetrating through the one side surface of the insulating body, and the accommodating groove is located near a rear end of the insulating body, the pressing element is accommodated in the accommodating groove.

3. The connector lock structure having a guarding function as claimed in claim 2, wherein the accommodating groove includes a first recess, a second recess and a third recess, the third recess is connected between the first recess and the second recess, the first recess and the second recess are located at two sides of the insulating body, the first recess and the second recess are symmetrical to each other with respect to the third recess, bottoms of the first recess, the second recess and the third recess are opened freely, an inner surface of a side wall of each of the first recess and the second recess is shown as an inverted U shape, the first recess penetrates through the one side surface of the insulating body, and an outer side of the first recess is defined as an opening, so that the first recess is communicated with an external space through the opening.

4. The connector lock structure having a guarding function as claimed in claim 3, wherein the third recess is a trapezoid shape which is seen from a side view.

5. The connector lock structure having a guarding function as claimed in claim 3, wherein the pressing element has a gear spindle and a gear, the gear spindle is transversely mounted in the accommodating groove, the gear spindle projects beyond the one side surface of the insulating body, the gear spindle is rotatably mounted in the accommodating groove, the gear is mounted around a middle of the gear spindle, two ends of the gear spindle are mounted in the first recess and the second recess, respectively.

6. The connector lock structure having a guarding function as claimed in claim 5, wherein a periphery of the gear has a plurality of teeth, several portions of the top surface of the sliding board are recessed inward to form a plurality of buckling slots, the top surface of the sliding board has a plurality of splines among the plurality of the buckling slots, each two adjacent buckling slots are isolated by a spline, the plurality of the splines of the sliding board are engaged with the plurality of the teeth of the gear of the pressing element, one end of the gear spindle has the locking portion, a bottom edge of one side of the shell adjacent to the opening of the first recess is recessed upward to form a locating groove, the locking portion with the keyhole projects out of the one side surface of the insulating body from the opening of the first recess, the locking portion with the keyhole projects out of the one side surface of the shell from the locating groove of the shell, the keyhole is matched with the unlocking tool, after the unlocking tool is inserted into the keyhole, the unlocking tool is rotated to make the unlocking tool drive the locking portion of the gear spindle of the pressing element to rotate, and then the gear of the pressing element drives the sliding board to move horizontally.

7. The connector lock structure having a guarding function as claimed in claim 6, wherein each tooth is protruded outward along a radial direction of the pressing element.

8. The connector lock structure having a guarding function as claimed in claim 6, wherein the plurality of the buckling slots are arranged along an insertion direction of the connector lock structure.

9. The connector lock structure having a guarding function as claimed in claim 1, wherein each of the keyhole and the unlocking tool is formed in a plum blossom shape.

10. The connector lock structure having a guarding function as claimed in claim 1, wherein each of the keyhole and the unlocking tool is formed in a polygon shape.

11. The connector lock structure having a guarding function as claimed in claim 1, wherein a rear end wall of the at least one lacking groove slantwise extends frontward and upward, and then is arched upward to form the at least one elastic arm, the at least one elastic arm is inclined towards a lower surface of the insulating body, the bottom surface of the insulating body surrounds a front and two sides of the lower surface of the insulating body, the tail end of the at least one elastic arm is punched upward from the bottom plate of the shell, and then is arched upward and towards the lower surface of the insulating body to form the hook structure, a top surface of the hook structure of the at least one elastic arm is a convex surface, the convex surface of the at least one elastic arm is arched upward, and the convex surface of the at least one elastic arm is an arc shape.

12. The connector lock structure having a guarding function as claimed in claim 1, wherein the locking assembly includes two lacking grooves and two elastic arms, two sides of the front end of the bottom plate of the shell define the two lacking grooves extending longitudinally, a rear end wall of each lacking groove slantwise extends frontward and upward, and then is arched upward to form the elastic arm, the bottom of the metal casing defines two blocking grooves, the tail end of each elastic arm has the hook structure, when the sliding board slides frontward, the sliding board slides over the two elastic arms and the sliding board presses the two elastic arms downward, the hook structures of the two elastic arms hook in the two blocking grooves, when the sliding board slides rearward, the sliding board slides away from the two elastic arms, and then the hook structures of the two elastic arms break away from the two blocking grooves.

13. The connector lock structure having a guarding function as claimed in claim 12, wherein two sides of a front end of a bottom surface of the sliding board slantwise extend frontward and upward to form two inclined surfaces, when the two elastic arms are in original states, the two inclined surfaces are parallel to inner surfaces of the two elastic arms.

14. The connector lock structure having a guarding function as claimed in claim 1, wherein two sides of a rear end of the bottom surface of the insulating body are recessed inward to form two guiding slots, rear ends of two side surfaces of the sliding board protrude outward and then extend upward to form two guiding blocks, the two guiding blocks are disposed in the two guiding slots, the two guiding blocks are able to slide in the two guiding slots.

15. The connector lock structure having a guarding function as claimed in claim 1, wherein a rear end of the bottom surface of the insulating body is recessed inward to form a sliding groove, an inner surface of a top wall of the sliding groove is defined as a lower surface of the insulating body, the sliding board is slidably mounted in the sliding groove, a bottom surface of the sliding board is flush with the bottom surface of the insulating body.

16. The connector lock structure having a guarding function as claimed in claim 1, wherein a middle of an inner surface of a front end wall of the sliding groove extends rearward to form an insertion block, a middle of a front end of the sliding board is recessed rearward to form a notch, the insertion block is inserted into the notch.

17. The connector lock structure having a guarding function as claimed in claim 1, wherein the pressing element is clamped between the sliding board and the insulating body.

18. The connector lock structure having a guarding function as claimed in claim 1, wherein each terminal has a contact portion, a soldering portion, and a body portion connected between the contact portion and the soldering portion, the body portion is received in the insulating body, the body portion has a middle region, a front region and a rear region, the middle region is connected between the front region and the rear region, the front region is connected between the contact portion and the middle region, the rear region is connected between the soldering portion and the middle region, the middle region is located above the pressing element, the front region is located in front of the pressing element, the rear region is located behind the pressing element, so the pressing element is surrounded by the body portion of each terminal.

19. A connector lock structure having a guarding function adapted for being docked with a docking connector, the docking connector having a metal casing, a bottom of the metal casing defining two blocking grooves, the connector lock structure comprising:

an insulating body;

a plurality of terminals, the insulating body being molded around the plurality of terminals;

a shell surrounding the insulating body, the shell having a bottom plate, the bottom plate being mounted to a bottom surface of the insulating body;

a locking assembly including two lacking grooves and two elastic arms, two sides of a front end of the bottom plate of the shell defining the two lacking grooves extending longitudinally, a rear end wall of each lacking groove slantwise extending frontward and upward, and then being arched upward to form the elastic arm, a tail end of each elastic arm having a hook structure;

a sliding board slidably mounted to the bottom surface of the insulating body, the sliding board sliding along a docking direction of the connector lock structure;

a pressing element mounted in the insulating body, the sliding board being slidably mounted under the pressing element, one end of the pressing element having a locking portion, an outer surface of the locking portion having a keyhole, the locking portion projecting beyond one side surface of the insulating body, the locking portion projecting beyond one side surface of the shell;

an unlocking tool inserted in the keyhole of the locking portion of the pressing element;

wherein the unlocking tool is rotated to make the unlocking tool drive the locking portion of the pressing element to rotate, when the sliding board slides frontward, the sliding board slides over the two elastic arms, and the sliding board presses the two elastic arms downward, the hook structures of the two elastic arms hook in the two blocking grooves, when the sliding board slides rearward, the sliding board slides away from the two elastic arms, and then the hook structures of the two elastic arms break away from the two blocking grooves, so that the two elastic arms are locked to or unlocked from the two blocking grooves of the metal casing of the docking connector.

20. A connector lock structure having a guarding function adapted for being docked with a docking connector, the docking connector having a metal casing, a bottom of the metal casing defining two blocking grooves, the connector lock structure comprising:

an insulating body;

a plurality of terminals, the insulating body being molded around the plurality of terminals;

a shell surrounding the insulating body, the shell having a bottom plate, the bottom plate being mounted to a bottom surface of the insulating body;

a locking assembly including two lacking grooves and two elastic arms, two sides of a front end of the bottom plate of the shell defining the two lacking grooves extending longitudinally, a rear end wall of each lacking groove slantwise extending frontward and upward, and then being arched upward to form the elastic arm, a tail end of each elastic arm having a hook structure;

a sliding board slidably mounted to the bottom surface of the insulating body, the sliding board sliding along a docking direction of the connector lock structure, two sides of a front end of a bottom surface of the sliding board slantwise extending frontward and upward to form two inclined surfaces, the two inclined surfaces being parallel to inner surfaces of initial ends of the two elastic arms;

a pressing element mounted in the insulating body, the sliding board being slidably mounted under the pressing element, one end of the pressing element having a locking portion, an outer surface of the locking portion having a keyhole, the locking portion projecting beyond one side surface of the insulating body, the locking portion projecting beyond one side surface of the shell;

an unlocking tool inserted in the keyhole of the locking portion of the pressing element;

wherein the unlocking tool is rotated to make the unlocking tool drive the locking portion of the pressing element to rotate, when the sliding board slides frontward, the sliding board slides over the two elastic arms, and the sliding board presses the two elastic arms downward, the hook structures of the two elastic arms hook in the two blocking grooves, when the sliding board slides rearward, the sliding board slides away from the two elastic arms, and then the hook structures of the two elastic arms break away from the two blocking grooves, so that the two elastic arms are locked to or unlocked from the two blocking grooves of the metal casing of the docking connector.

* * * * *